(12) United States Patent
Asahina et al.

(10) Patent No.: US 6,711,274 B2
(45) Date of Patent: Mar. 23, 2004

(54) COMPOUND SPEAKER FOR A PORTABLE COMMUNICATION DEVICE

(75) Inventors: Masato Asahina, Yamanashi-ken (JP); Masahito Furuya, Yamanashi-ken (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 0 days.

(21) Appl. No.: 10/245,391

(22) Filed: Sep. 18, 2002

(65) Prior Publication Data

US 2003/0059079 A1 Mar. 27, 2003

(30) Foreign Application Priority Data

Sep. 21, 2001 (JP) ........................................ 2001-290269

(51) Int. Cl.[7] .............................................. H04R 25/00
(52) U.S. Cl. ........................ 381/386; 381/338; 381/345; 381/182
(58) Field of Search ................................ 381/345, 349, 381/350, 351, 353, 354, 338, 396, 397, 182, 186, 391, 189

(56) References Cited

U.S. PATENT DOCUMENTS 6,212,284 B1 * 4/2001 Puls ........................... 381/345

\* cited by examiner

*Primary Examiner*—Huyen Le
(74) *Attorney, Agent, or Firm*—Dennison, Schultz, Dougherty & MacDonald

(57) ABSTRACT

A compound speaker has first and second sound production devices provided in a case. First and second sound discharge holes are formed in the case for discharging sounds produced by the first and second sound production devices, respectively. The first sound discharge hole is formed in a peripheral side wall of the case so as to discharge sounds in a lateral direction.

1 Claim, 10 Drawing Sheets

COMPOUND SPEAKER FOR A PORTABLE COMMUNICATION DEVICE

BACKGROUND OF THE INVENTION

The present invention relates to a compound speaker for a portable communication device such as a portable telephone.

The portable telephone has a speaker for converting a call signal into a sound and a receiver for connecting a sound signal into a sound. If the speaker and the receiver are disposed at different positions in the telephone, it is difficult to compose the telephone in a miniature. In order to miniaturize the portable telephone, the compound speaker is provided.

FIG. 13 is a plan view of a conventional compound speaker, FIG. 14 is a sectional view taken along a line XIV—XIV of FIG. 13, FIG. 15 is an underside view, and FIG. 16 is a sectional view taken along a line XVI—XVI of FIG. 15.

In a case 1 made of synthetic resin, there is provided a yoke 2 made of a magnetic material.

The yoke 2 comprises a flange 2a formed on an upper periphery of a cylindrical portion 2b having a bottom 2c. An annular first magnet 3 is secured to the underside of the flange 2a, and a second magnet 8 having disc shape is secured to the bottom 2c of the yoke 2. An annular first top plate 4 made of a magnetic material is secured to the underside of the first magnet 3, and a second top plate 9 having a disc shape is secured to the upper surface of the second magnet 8.

A first diaphragm 6 is secured to the underside of the case 1, and a second diaphragm 11 is secured to the upper surface of the case 1. A first voice coil 5 and a second voice coil 10 are secured to inside surfaces of the first and second diaphragms 6 and 11, respectively. The first diaphragm 6 and the first voice coil 5 compose a first sound production device as a speaker, and the second diaphragm 11 and the second voice coil 10 compose a second sound production device as a receiver. Protectors 7 and 12 are secured to the underside and upper surface of the case 1 for protecting the diaphragms 6 and 11.

There are formed two magnetic gaps. One of the magnetic gaps is a magnetic gap between the periphery of the cylindrical portion 2b of the yoke 2 and the inside wall of the top plate 4. A magnetic field is formed in the magnetic gap based on the magnetic force of the first magnet 3.

The other is a magnetic gap between the inside wall of the cylindrical portion 2b and the periphery of the top plate 9. A magnetic field is formed in the gap by the magnetic force of the second magnet 8.

When a signal current is applied to the voice coil 5 or 10, the diaphragm 6 or 11 is vibrated to generate sounds.

There is formed sound discharge holes 7a formed in the protector 7, sound discharge holes 12a in the protector 12. Furthermore, there are formed vents 1a behind the diaphragm 6 and vents 1b beside the diaphragm 11.

FIG. 17 is a sectional side view showing the conventional compound speaker mounted in a case of a portable telephone, FIG. 18 is a sectional plan view of the portable telephone. A circuit substrate 23 is securely mounted in a case 22 by supporting pillars 22c. The circuit substrate 23 has a large recess 23a. The compound speaker 21 is disposed in the recess 23a and securely mounted in the case 22 by posts 22b. The protectors 7 and 12 are held by resilient members 24 and 25 such as rubber. Terminal electrodes 13 of the compound speaker 21 are connected to a circuit on the circuit substrate 23 by flexible print plates 26. There is provided a liquid crystal display 29 in the case 22.

FIG. 19 is a sectional side view showing another method for mounting the speaker in the case, and FIG. 20 is a sectional plan view.

As shown in FIG. 19, a lead wire 14 is drawn from each terminal electrode 13. Further, the lead wire 14 is connected to the circuit substrate 23.

In the conventional compound speaker, sound discharge holes 7a and 12a are provided on the upper side and the lower side of the speaker as shown in FIG. 14. Therefore, the speaker can not be directly mounted on the circuit substrate 23. Consequently, as shown in FIGS. 18 and 20, the large recess 23a is formed in the substrate 23, the substrate must be supported at an intermediate height, and the speaker 21 must be disposed in the recess. Furthermore, sound discharge holes 28 must be formed in both sides of the case 22. Therefore, a complicated supporting structure is necessary, and the appearance of the portable telephone decreases because of the sound discharge holes.

SUMMARY OF THE INVENTION

An object of the present invention is to provide a compound speaker which may directly be mounted on a circuit substrate.

According to the present invention, there is provided a compound speaker comprising a case having a peripheral side wall, a first sound production device provided in the case, a second sound production device provided in the case, a first sound discharge hole formed in the case for discharging sounds produced by the first sound production device, a second sound discharge hole formed in the case for discharging sounds produced by the second sound production device, at least one of the first and second sound discharge holes being formed in the peripheral side wall so as to discharge sounds in a lateral direction.

The discharge hole provided in the peripheral side wall is provided in a sound discharge pipe projected from the side wall.

The first and second sound discharge holes are formed in protectors provided for protecting the first and second sound production devices.

These and other objects and features of the present invention will become more apparent from the following detailed description with reference to the accompanying drawings.

DETAILED DESCRIPTION OF THE PREFERRED EMBODIMENT

Figure 1:
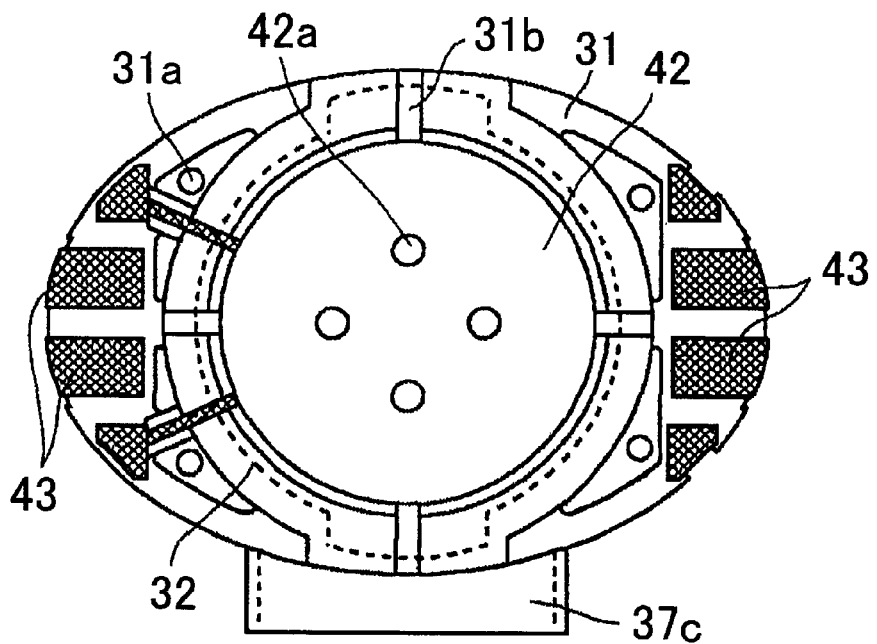
FIG. 1 is a plan view of a compound speaker of a first embodiment according to the present invention.
Figure 2:
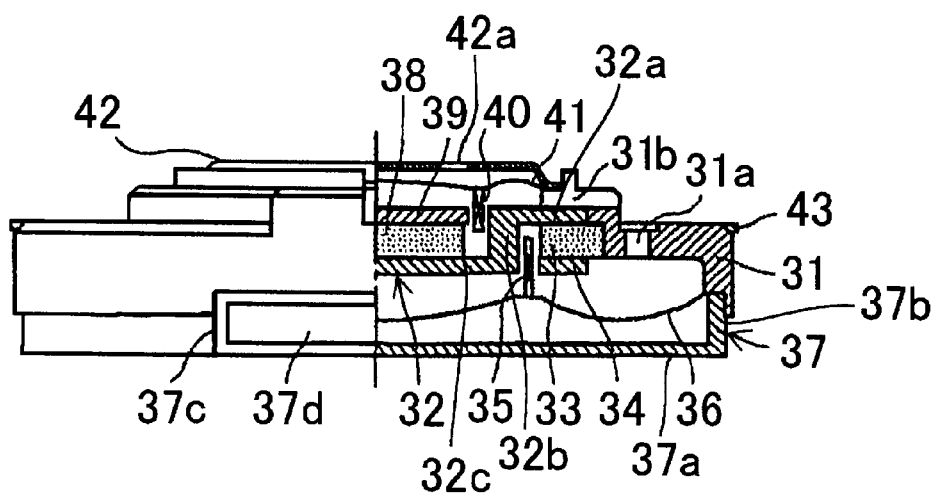
FIG. 2 is a partial side view of the speaker.
Figure 3:
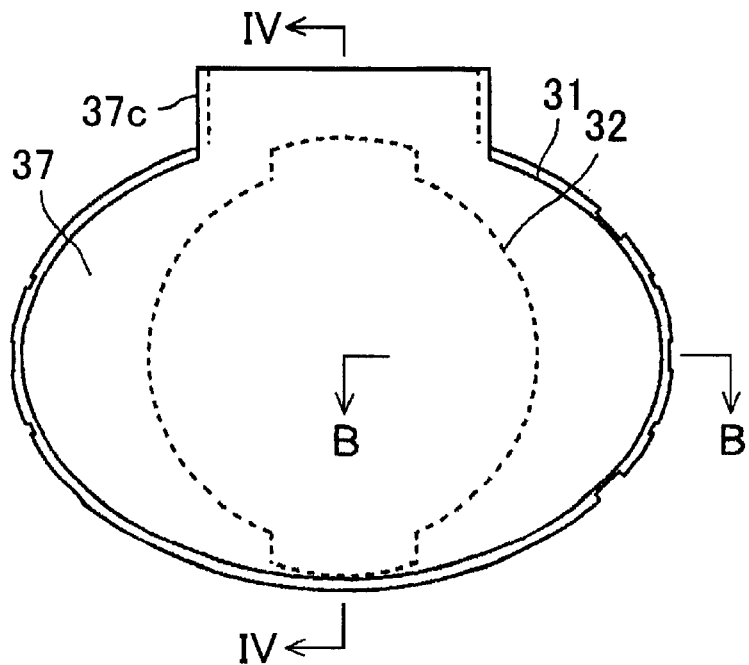
FIG. 3 is an underside view.
Figure 4:
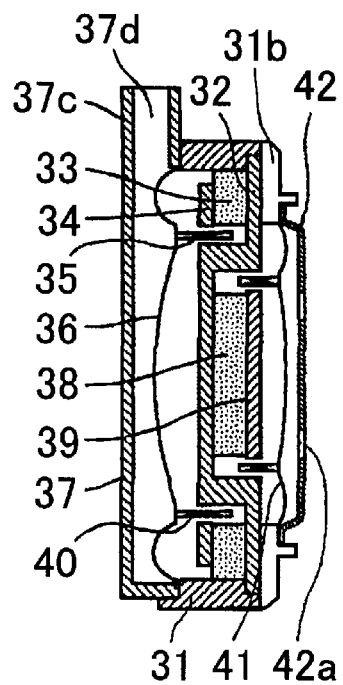
FIG. 4 is a sectional view taken along a line IV—IV of FIG. 3.

FIG. 1 is a plan view of a compound speaker of a first embodiment according to the present invention, FIG. 2 is a partial sectional side view of the speaker, FIG. 3 is an underside view, and FIG. 4 is a sectional view taken along a line IV—IV of FIG. 3.

In a case 31 made of synthetic resin, there is provided a yoke 32 made of a magnetic material.

The yoke 32 comprises a flange 32a formed on an upper periphery of a cylindrical portion 32b having a bottom 32c. An annular first magnet 33 is secured to the underside of the flange 32a by the adhesive, and a second magnet 38 having disc shape is secured to the bottom 32c of the yoke 32. An annular first top plate 34 made of a magnetic material is secured to the underside of the first magnet 33, and a second top plate 39 having a disc shape is secured to the upper surface of the second magnet 38.

A first diaphragm 36 is secured to the underside of the case 31, and a second diaphragm 41 is secured to the upper surface of the case 31. A first voice coil 35 and a second voice coil 40 are secured to inside surfaces of the first and second diaphragms 36 and 41, respectively. The first diaphragm 36 and the first voice coil 35 compose a first sound production device as a speaker, and the second diaphragm 41 and the second voice coil 40 compose a second sound production device as a receiver. First and second protectors 37 and 42 are secured to the underside and upper surface of the case 31 for protecting the diaphragms 36 and 41.

As shown in FIGS. 2 and 4, the first protector 37 comprises a base plate 37a and a peripheral side wall 37b so as to surround the first diaphragm 36. A sound discharge pipe 37c having a rectangular sectional shape is projected from the base plate 37a and side wall 37b of the first protector 37 at a side of the protector. A sound discharge hole 37d is communicated with the space in the protector so as to discharge sounds generated by the diaphragm 36 in a lateral direction of the case 31.

The second protector 42 has sound discharge holes 42a so as to discharge sounds generated by the second diaphragm 41 in the upward direction.

Figure 5:
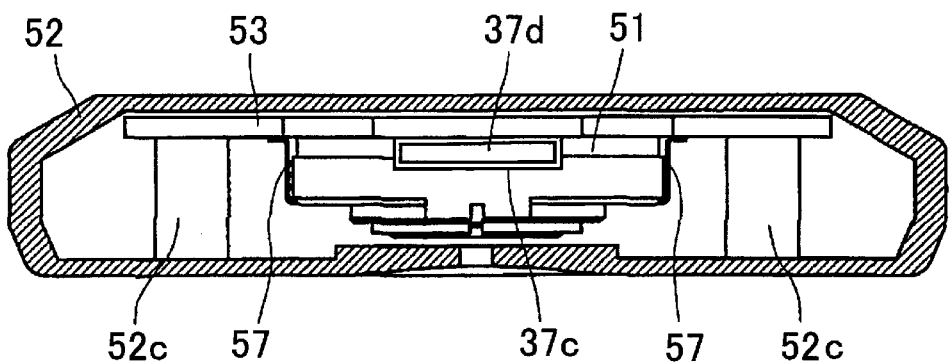
FIG. 5 is a sectional side view showing the compound speaker mounted in a case of a portable telephone.
Figure 6:
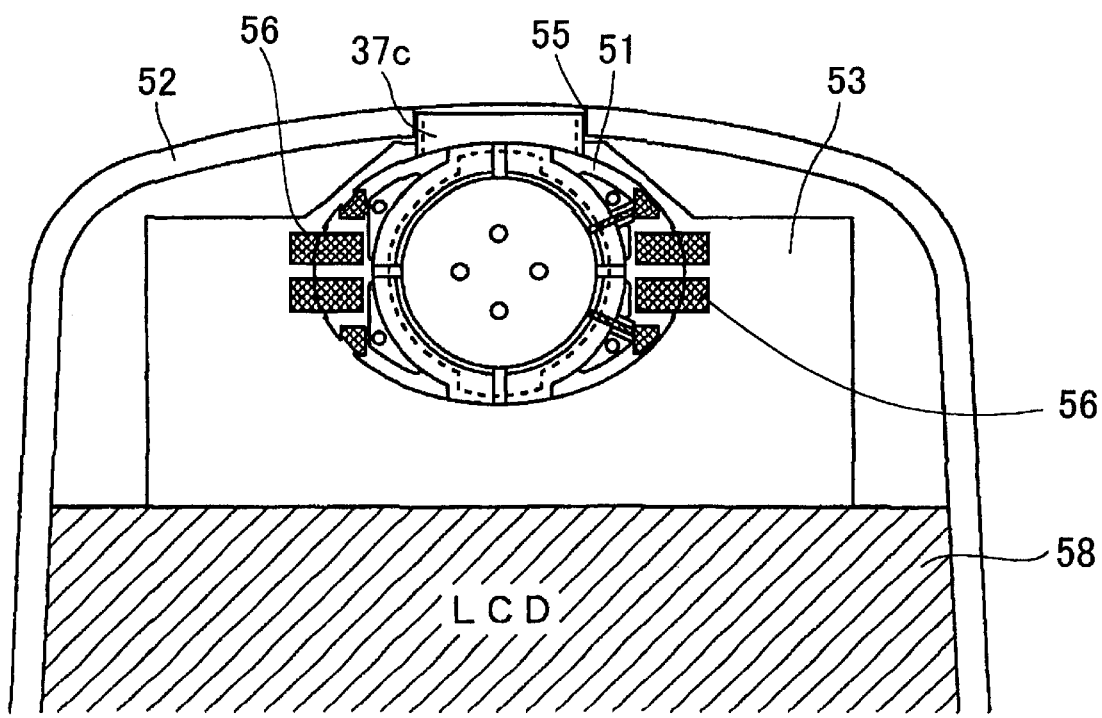
FIG. 6 is a sectional plan view of the portable telephone.

FIG. 5 is a sectional side view showing the compound speaker mounted in a case of a portable telephone, FIG. 6 is a sectional plan view of the portable telephone. A circuit substrate 53 is securely mounted in a case 52 by supporting pillars 52c. The compound speaker 51 is directly mounted on the circuit substrate 53. The sound discharge pipe 37c is inserted in a hole 55 formed in the case 52. Terminal electrodes 56 of the compound speaker 51 are connected to a circuit on the circuit substrate 53 by leads 57 extending from the terminal electrodes 56. There is provided a liquid crystal display 58 in the case 52.

Thus, the sound produced by the first sound production device is discharged in a lateral direction from the sound discharge hole 37d.

Figure 7:
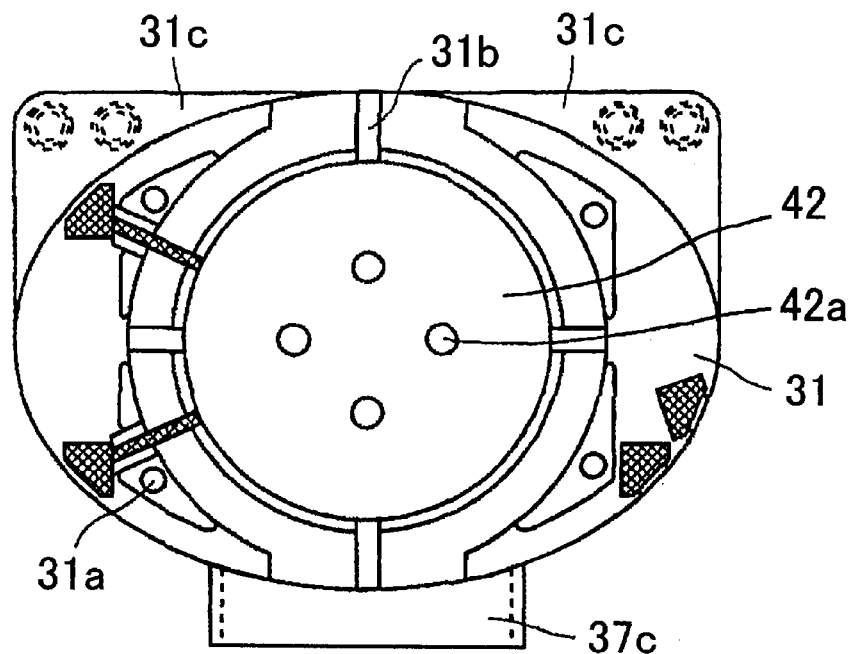
FIG. 7 is a plan view showing a second embodiment of the present invention.
Figure 8:
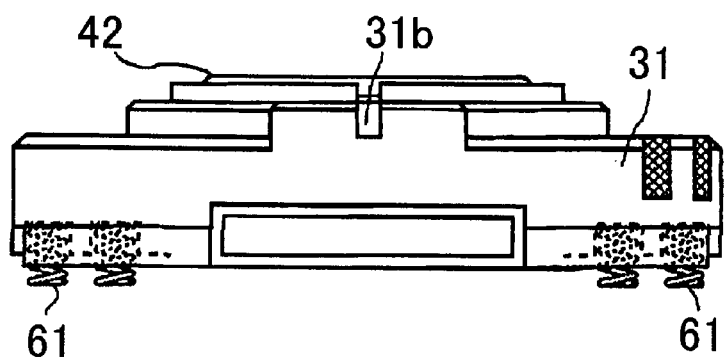
FIG. 8 is a side view.
Figure 9:
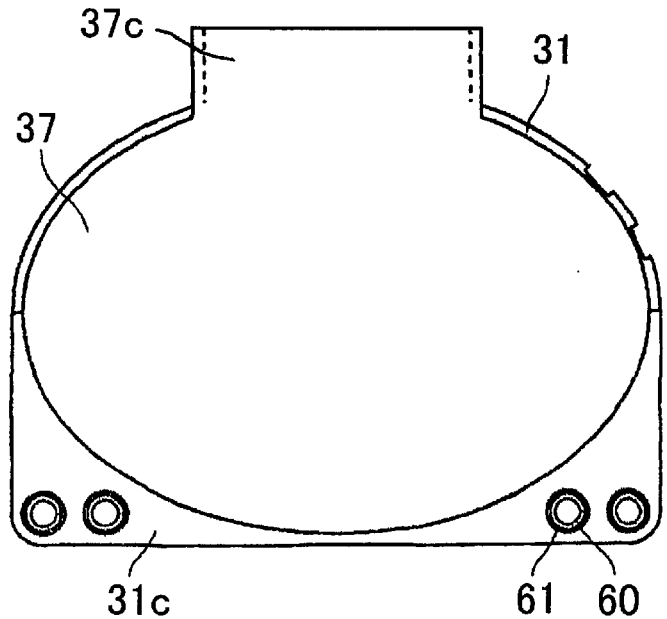
FIG. 9 is an underside view.
Figure 10:
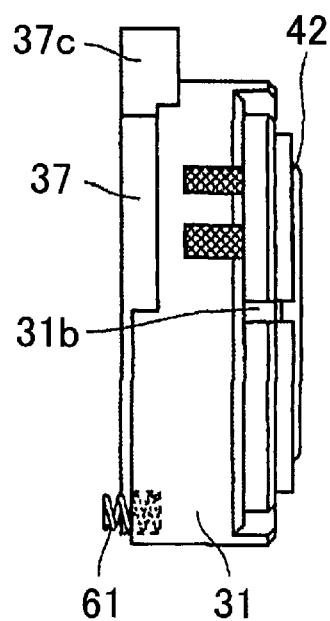
FIG. 10 is another side view.
Figure 11:
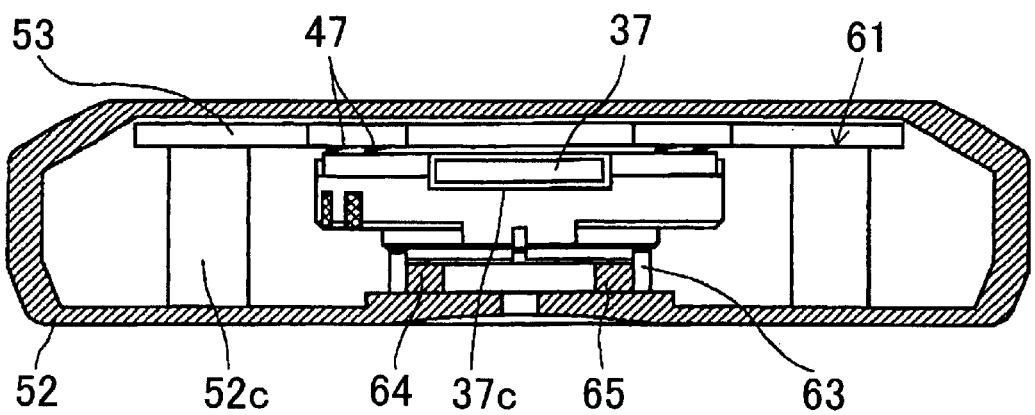
FIG. 11 is a sectional side view showing the compound speaker mounted of the second embodiment in a case of a portable telephone.
Figure 12:
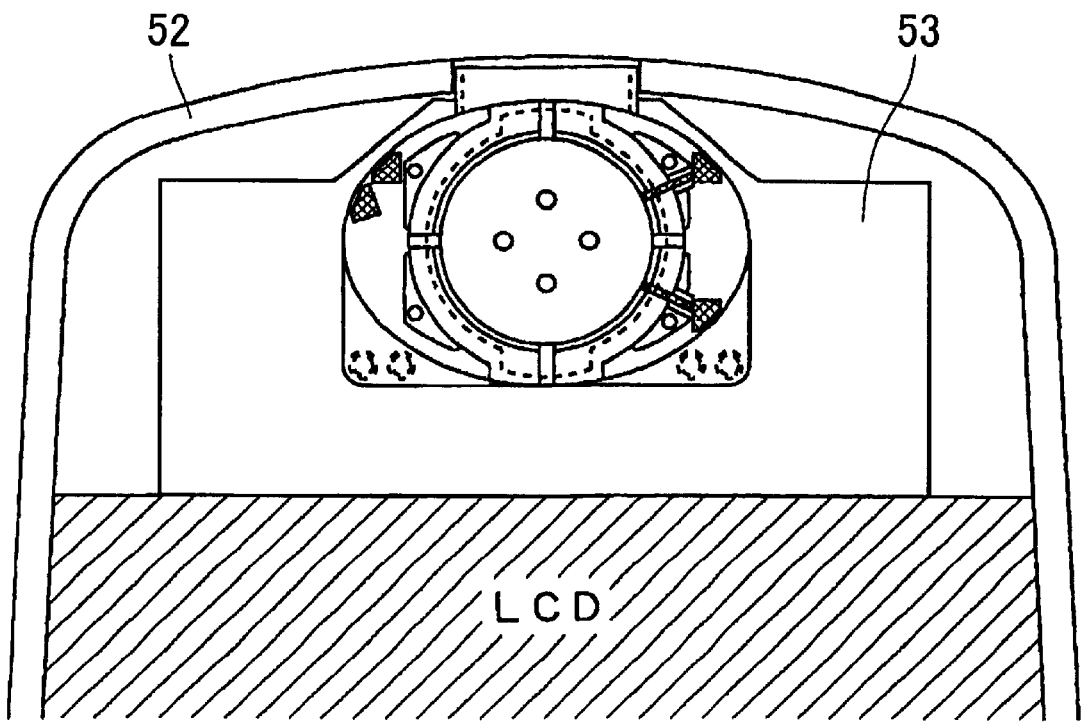
FIG. 12 is a sectional plan view of the portable telephone.
Figure 13:
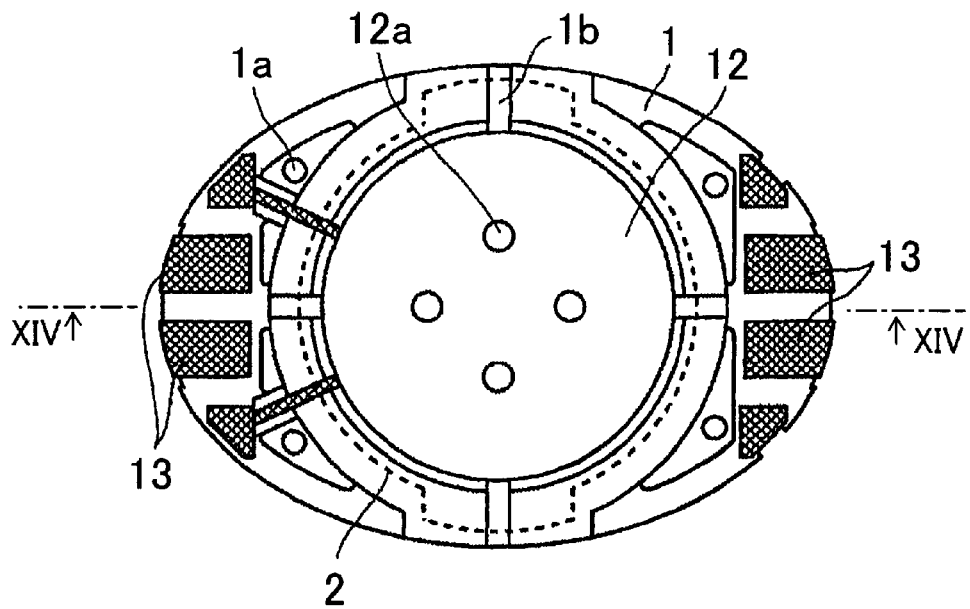
FIG. 13 is a plan view of a conventional compound speaker.
Figure 14:
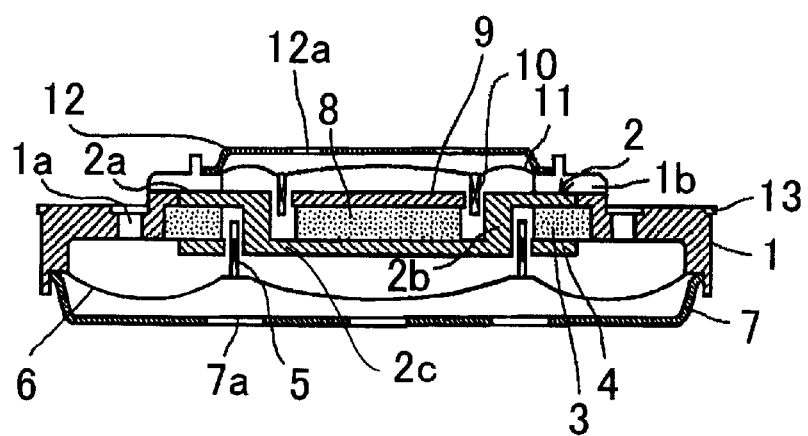
FIG. 14 is a sectional view taken along a line XIV—XIV of FIG. 13.
Figure 15:
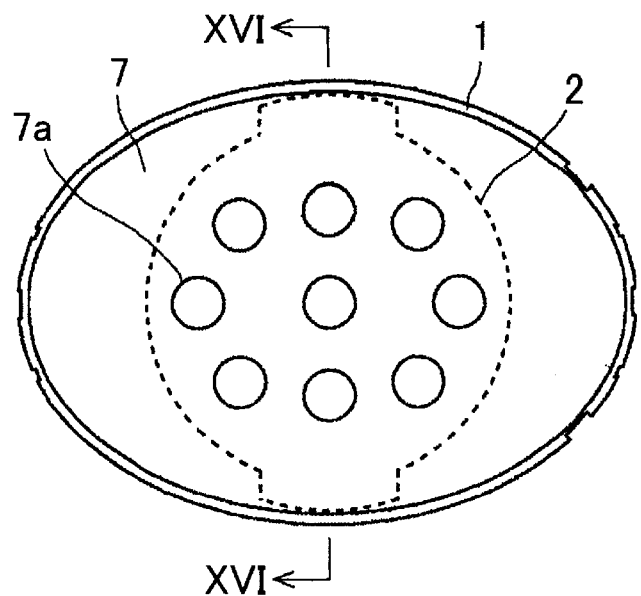
FIG. 15 is an underside view.
Figure 16:
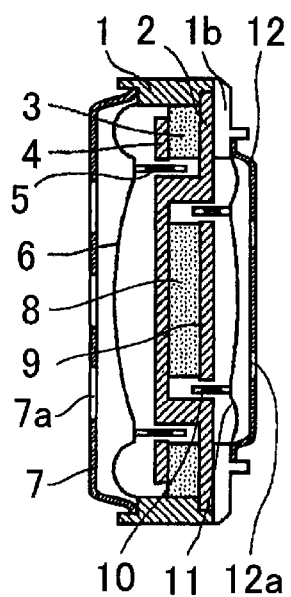
FIG. 16 is a sectional view taken along a line XVI—XVI of FIG. 15.
Figure 17:
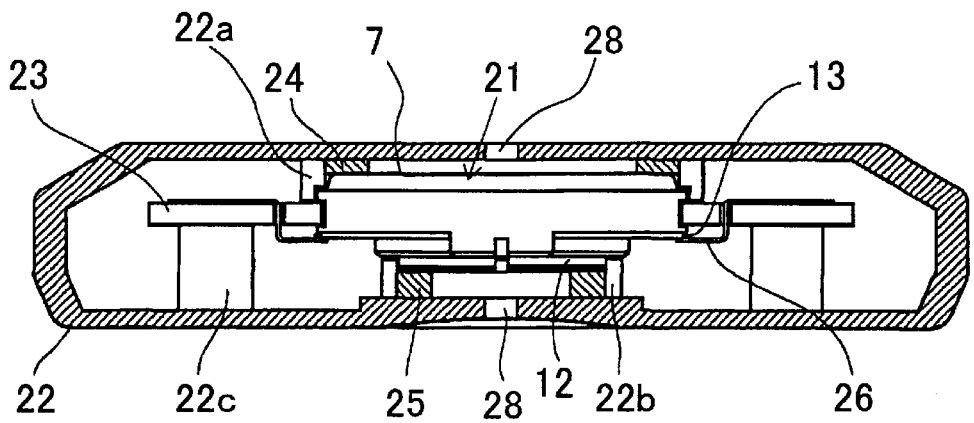
FIG. 17 is a sectional side view showing the conventional compound speaker mounted in a case of a portable telephone.
Figure 18:
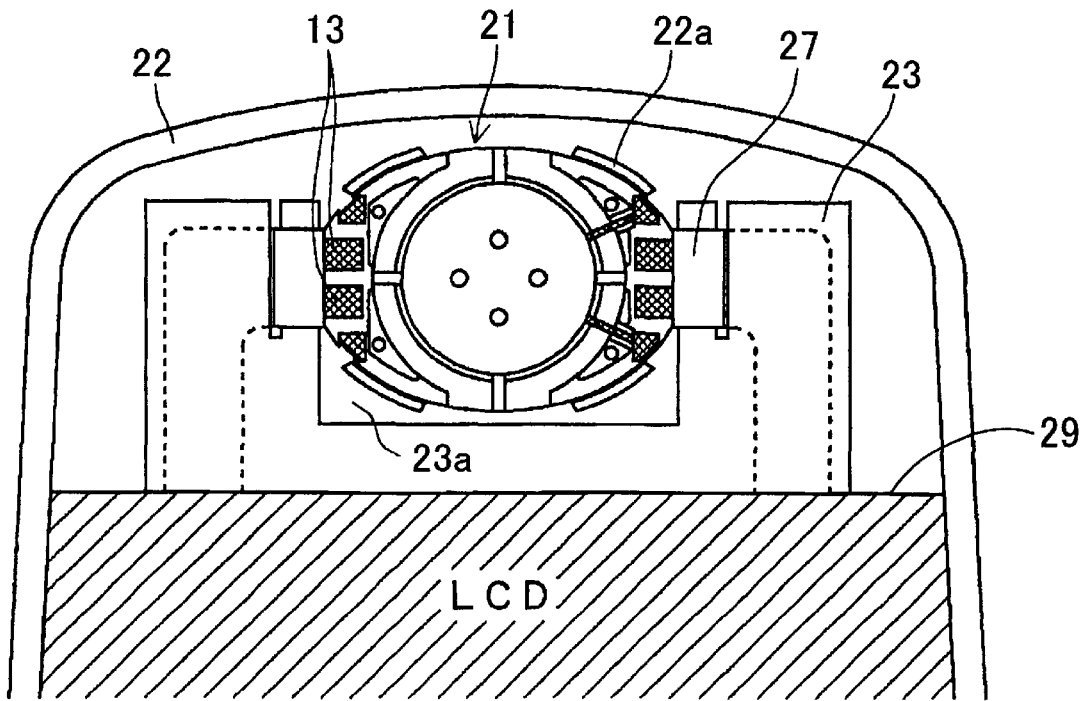
FIG. 18 is a sectional plan view of the portable telephone.
Figure 19:
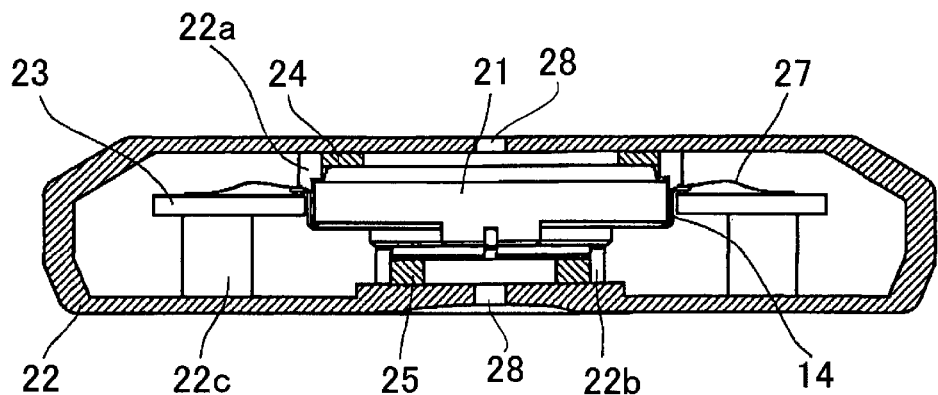
FIG. 19 is a sectional side view showing another method for mounting the speaker in the case.
Figure 20:
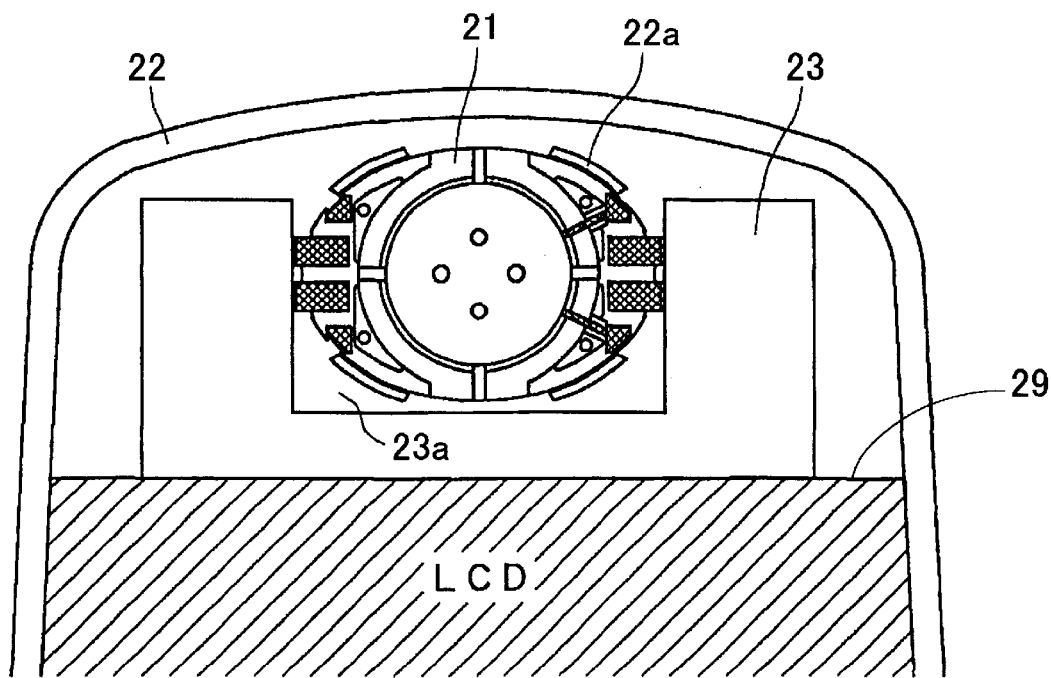
FIG. 20 is a sectional plan view.

FIG. 7 is a plan view showing a second embodiment of the present invention, FIG. 8 is a side view, FIG. 9 is an underside view, and FIG. 10 is another side view.

The same parts as the first embodiment are identified with the same reference numerals thereof.

A projected portion 31c is formed on the side wall of the case 31 at a position opposite the sound discharge pipe 37c. In the underside of the projected portion 31c, four cylindrical holes 60 are formed. In each hole 60, a spring terminal 61 is inserted. The inner end of the spring terminal 61 is connected to voice coil 35 or 40.

The compound speaker is mounted on the circuit substrate 53. The compound speaker is supported by posts 63, and the protector 42 is supported by a resilient member 64. The spring terminals 61 are pressed against a circuit pattern of the substrate 53.

In accordance with the present invention, the compound speaker can directly be mounted on the circuit substrate, so that the manufacturing process and the construction are simplified.

While the invention has been described in conjunction with preferred specific embodiment thereof, it will be understood that this description is intended to illustrate and not limit the scope of the invention, which is defined by the following claims.

What is claimed is:

1. A compound speaker comprising:

a case having a central axis and a peripheral side wall;

a first sound production device having a first diaphragm and a first protector, and provided in the case;

a second sound production device having a second diaphragm and a second protector, and provided in the case;

a first sound discharge hole communicating with a space formed between the first diaphragm and the first protector for discharging sounds produced by the first sound production device;

a second sound discharge hole communicating with a space formed between the second diaphragm and the second protector for discharging sounds produced by the second sound production device; and at least one of the first and second sound discharge holes being formed in the peripheral side wall so as to discharge sounds in a lateral direction which is perpendicular to the central axis of the case, and wherein the at least one of the first and second sound discharge holes provided in the peripheral side wall is provided in a sound discharge pipe projected from the side wall in the lateral direction.

* * * * *